US012003917B2

(12) United States Patent
Hu et al.

(10) Patent No.: US 12,003,917 B2
(45) Date of Patent: Jun. 4, 2024

(54) SPEAKER

(71) Applicant: AAC Microtech (Changzhou) Co., Ltd., Changzhou (CN)

(72) Inventors: Hongjian Hu, Shenzhen (CN); Shuai Li, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 108 days.

(21) Appl. No.: 17/833,877

(22) Filed: Jun. 6, 2022

(65) Prior Publication Data

US 2023/0239608 A1 Jul. 27, 2023

(30) Foreign Application Priority Data

Jan. 21, 2022 (CN) ........................ 202220184941.5

(51) Int. Cl.

| | |
|---|---|
| ***H04R 1/02*** | (2006.01) |
| ***G10K 11/16*** | (2006.01) |
| ***H04R 1/28*** | (2006.01) |
| ***H04R 9/02*** | (2006.01) |
| ***H04R 9/06*** | (2006.01) |

(52) U.S. Cl.

CPC ............ *H04R 1/2811* (2013.01); *G10K 11/16* (2013.01); *H04R 1/026* (2013.01); *H04R 9/027* (2013.01); *H04R 9/06* (2013.01)

(58) Field of Classification Search

CPC . H04R 1/00; H04R 1/02; H04R 1/026; H04R 1/28; H04R 1/2803; H04R 1/2811; H04R 9/027; H04R 9/036; H04R 9/04; H04R 9/045; H04R 9/06; H04R 11/02; H04R 19/02; G10K 11/16; G10K 11/004

See application file for complete search history.

(56) References Cited

U.S. PATENT DOCUMENTS

| | | | | |
|---|---|---|---|---|
| 5,894,263 | A * | 4/1999 | Shimakawa | G08B 6/00 340/407.1 |
| 9,060,220 | B1 * | 6/2015 | O'Neal | H04R 1/2842 |
| 11,589,167 | B1 * | 2/2023 | Xiao | H04R 1/025 |
| 2022/0038813 | A1 * | 2/2022 | Mori | H04R 1/2888 |

FOREIGN PATENT DOCUMENTS

| | | | | |
|---|---|---|---|---|
| CN | 111131977 A * | 5/2020 | | H04R 7/127 |
| WO | WO-0141322 A1 * | 6/2001 | | B06B 1/045 |

* cited by examiner

*Primary Examiner* — Thang V Tran

(74) *Attorney, Agent, or Firm* — W&G Law Group

(57) ABSTRACT

The present invention provides a speaker, including: a housing body having an accommodation cavity with a first chamber and a second chamber; a first side wall and a second side wall enclosing the first chamber; a third side wall and a fourth side wall enclosing the second chamber; and a speaker unit including a connection part located in the first chamber and a sounding component connecting to the connection part. A distance between the first side wall and the second side wall is smaller than a distance between the third side wall and the fourth side wall. The speaker enables the connection part to be connected to the side wall of the housing body without the end of the connection part needing to exceed the end of the sounding component, which reduces the volume of the housing body and facilitates the miniaturized design of the speaker.

9 Claims, 4 Drawing Sheets

SPEAKER

FIELD OF THE PRESENT DISCLOSURE

The present invention relates to the field of acoustic technology, in particular to a speaker.

DESCRIPTION OF RELATED ART

The broadcasting function of electronic product is generally realized by a speaker structure, which usually includes a housing body and a speaker unit installed in the housing body. The speaker unit is provided with a lower splint, and is connected with the side wall of the housing body through the lower splint. In the prior art, one end of the lower splint connected to the housing bodyside wall is more protruding than other structures of the speaker unit, thereby facilitating the connection of the lower clamp board to the housing bodyside wall. However, the above arrangement will lead to an increase in the external dimension of the housing body, which is not conducive to the miniaturized design of the speaker structure.

Therefore, it is necessary to provide a new speaker to solve the above problems.

SUMMARY OF THE PRESENT INVENTION

The purpose of the present invention is to provide a speaker that can reduce the volume of the housing body and is conducive to the miniaturized design of the speaker.

Accordingly, the present invention provides a speaker, including: a housing body having an accommodation cavity with a first chamber and a second chamber oppositely arranged along a height direction; a first side wall and a second side wall enclosing the first chamber along a width direction of the accommodation cavity; a third side wall and a fourth side wall enclosing the second chamber; and a speaker unit including a connection part located in the first chamber and a sounding component connecting to the connection part. Two ends of the connection part are respectively connected with the first side wall and the second side wall, and at least part of the sounding component is located in the second chamber.

The first side wall and the third side wall are connected; the second side wall and the fourth side wall are connected; a distance between the first side wall and the second side wall is smaller than a distance between the third side wall and the fourth side wall.

In addition, the housing body includes a front housing and a rear housing oppositely arranged along the height direction of the accommodation cavity; the front housing and the rear housing are connected for enclosing the accommodation cavity; the first chamber is arranged in the rear housing, and the second chamber is arranged in the front housing.

In addition, the sounding component includes a magnetic circuit system, a vibration system, a basin frame and a cover, the basin frame is connected with the front housing, along the height direction of the accommodation cavity, the connection part is set opposite to the cover; the connection part and the cover are respectively covered on both sides of the basic frame, and are enclosed with the basic frame to form a containment space; both the magnetic circuit system and the vibration system are located in the containment space.

In addition, the front housing includes a first through hole; the second chamber is connected with the outside through the first through hole; the cover is provided with a panel; the panel is provided with a sound exit hole; the panel protrudes from the first through hole.

In addition, the connection part includes a plurality of spaced positioning gaps; the basic frame is provided with a plurality of spaced positioning blocks; the positioning block is set corresponding to the positioning gap; the positioning block can abut against two adjacent side surfaces of the positioning gap.

In addition, the magnetic circuit system includes a magnetic conductive plate, a first magnet and at least two second magnets; both the first magnet and the second magnet are connected to the connection part; along the height direction of the accommodation cavity, the magnetic conductive plate is located below the first magnet and the second magnet; along the height direction perpendicular to the accommodation cavity, the two second magnets are disposed on opposite sides of the first magnet, respectively; a magnetic gap is formed between the first magnet and the second magnet.

The vibration system includes a voice coil, a bracket, at least two electric conductive plates and at least two vibration diaphragms; the voice coil is located within the magnetic gap; the two electric conductive plates are located on opposite sides of the voice coil; one end of the electric conductive plate is connected to the basin frame, and the other end is connected to the bracket; the vibration diaphragm is connected to the electric conductive plate; the voice coil is connected to the bracket and electrically connected to the electric conductive plate.

In addition, the vibration system also includes a dome, along the height direction of the accommodation cavity, the dome is disposed opposite to the voice coil. The dome is connected to the bracket.

In addition, the magnetic conductive plate includes a first magnetic conduction plate and a second magnetic conduction plate, and the first magnetic conduction plate is connected to the first magnet; the first magnetic conduction plate is sheathed in the voice coil; the second magnetic conduction plate is connected to the second magnet; the second magnetic conduction plate surrounds the voice coil.

In addition, the speaker further includes a box located in the first chamber and connected with the rear housing; wherein the box is used for placing sound-absorbing particles.

One side of the box includes an opening, and the rear housing includes a second through hole; the box is connected with the outside world through the second through hole.

The speaker further includes a sealing plug for blocking the second through hole.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
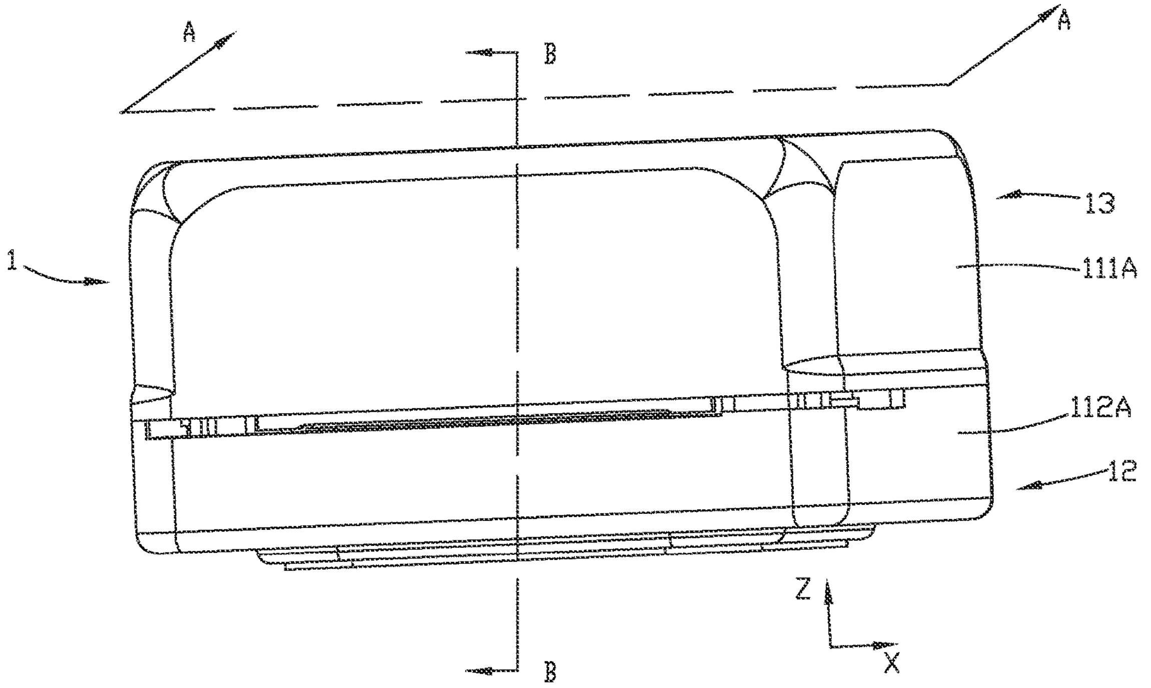
FIG. 1 is an isometric view of a speaker in accordance with an embodiment provided by the present invention.

As shown in FIG. 1, this embodiment provides a speaker, which is a transducer device that converts an electric signal into an acoustic signal. The speaker can be applied to portable consumer electronic product such as mobile phones, and can also be applied to electronic product such as car audio, computers, etc., to issue sound prompts.

As shown in FIGS. 1-5, this kind of speaker includes a housing body 1 and a speaker unit 2. Housing body 1 is provided with accommodation cavity 11. The accommodation cavity 11 at least includes a first chamber 111 and a second chamber 112 which are oppositely arranged along its height direction Z. Along the width direction X of the accommodation cavity 11, the first chamber 111 includes a first side wall 111A and a second side wall 111B arranged oppositely, and the second chamber 112 includes a third side wall 112A and a fourth side wall 112B arranged oppositely, the speaker unit 2 includes a connection part 21 and a sounding component 22 that are connected to each other. The connection part 21 is located in the first chamber 111, and two ends of the connection part 21 are respectively connected to the first side wall 111A and the second side wall 111B, and at least part of the sounding component 22 is located in the second chamber 112. Wherein, the first side wall 111A is connected to the third side wall 112A, and the second side wall 111B is connected to the fourth side wall 112B. The distance between the first side wall 111A and the second side wall 111B is smaller than the distance between the third side wall 112A and the fourth side wall 112B.

In this embodiment, at least part of the sounding component 22 is connected to the side wall of the housing body 1 through the connection part 21, so that at least part of the speaker unit 2 is installed in the accommodation cavity 11 of the housing body 1. Both ends of the connection part 21 are respectively connected to the first side wall 111A and the second side wall 111B. The distance between the first side wall 111A and the second side wall 111B is smaller than the distance between the third side wall 112A and the fourth side wall 112B, so that when the connection part 21 is connected to the side wall of the housing body 1, the end of the connection part 21 is not needed to exceed the end of the sounding component 22. The volume of the speaker unit 2 is reduced, and the volume of the housing body 1 is also reduced accordingly, even if the space occupied by the speaker is reduced, which is beneficial to the miniaturized design of the speaker.

Wherein, the housing body 1 can provide protection for the speaker unit 2, reduce the risk of damage to the speaker unit 2 due to extrusion or collision with external objects, and prolong the service life of the speaker unit 2.

The height direction Z and width direction X of accommodation cavity 11, namely the height direction Z and width direction X of housing body 1.

At least a part of the sounding component 22 is located in the second chamber 112, and the whole of the sounding component 22 may be located in the second chamber 112. In this case, the speaker unit 2 is all installed in the housing body 1. It is also possible that a part of the sounding component 22 is located inside the second chamber 112 and the other part is located outside the second chamber 112.

The connection part 21 can be a connection board, a connection block, and the like.

Figure 2:
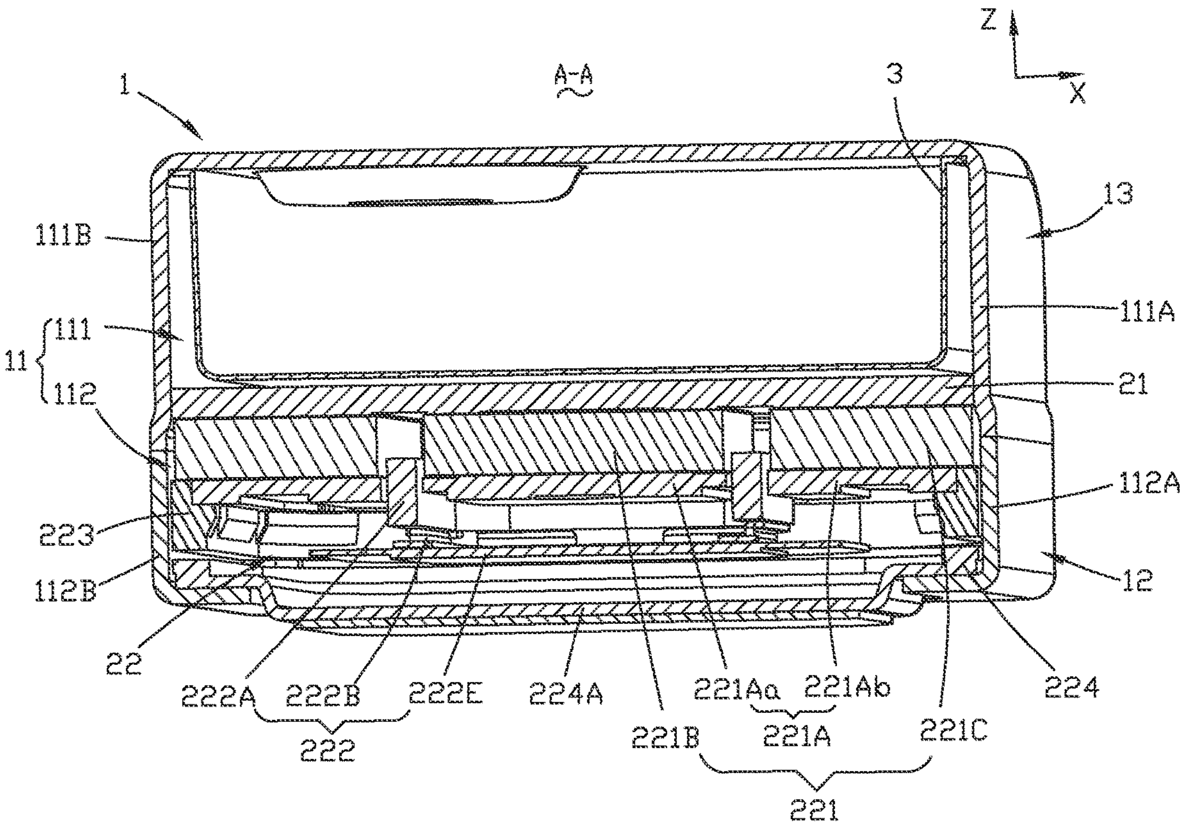
FIG. 2 is a cross-sectional view of the speaker taken along line AA in FIG. 1.

In a specific embodiment, as shown in FIG. 2, the housing body 1 includes a front housing 12 and a rear housing 13 which are oppositely arranged along the height direction Z of the accommodation cavity 11. The front housing 12 and the rear housing 13 are connected to enclose the accommodation cavity 11. The first chamber 111 is installed in the rear housing 13, and the second chamber 112 is installed in the front housing 12.

In this embodiment, housing body 1 includes front housing 12 and rear housing 13, and front housing 12 and rear housing 13 can be made independently, which is convenient for the processing of housing body 1. The first chamber 111 is arranged in the rear housing 13, the second chamber 112 is arranged in the front housing 12, that is, the connection part 21 is located in the rear housing 13, and is connected to the side wall of the rear housing 13, and at least part of the sounding component 22 is installed in the front housing 12, so that the speaker unit 2 can be installed in the housing body 1. Moreover, the front housing 12 and the rear housing 13 can also be provided with detachable connections, which facilitates the disassembly and assembly of the speaker unit 2 and subsequent maintenance and replacement operations.

Figure 3:
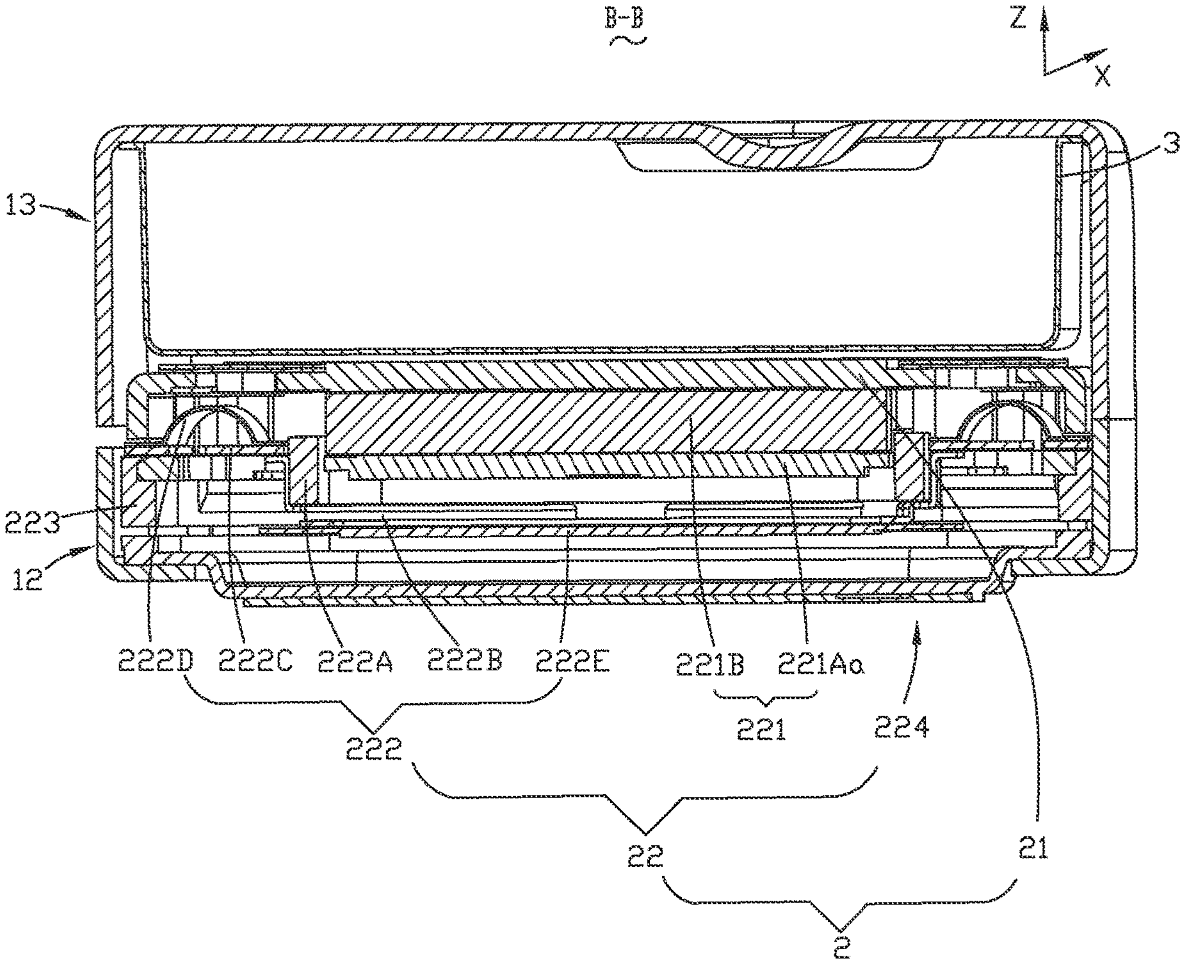
FIG. 3 is a cross-sectional view of the speaker taken along line BB in FIG. 1.
Figure 4:
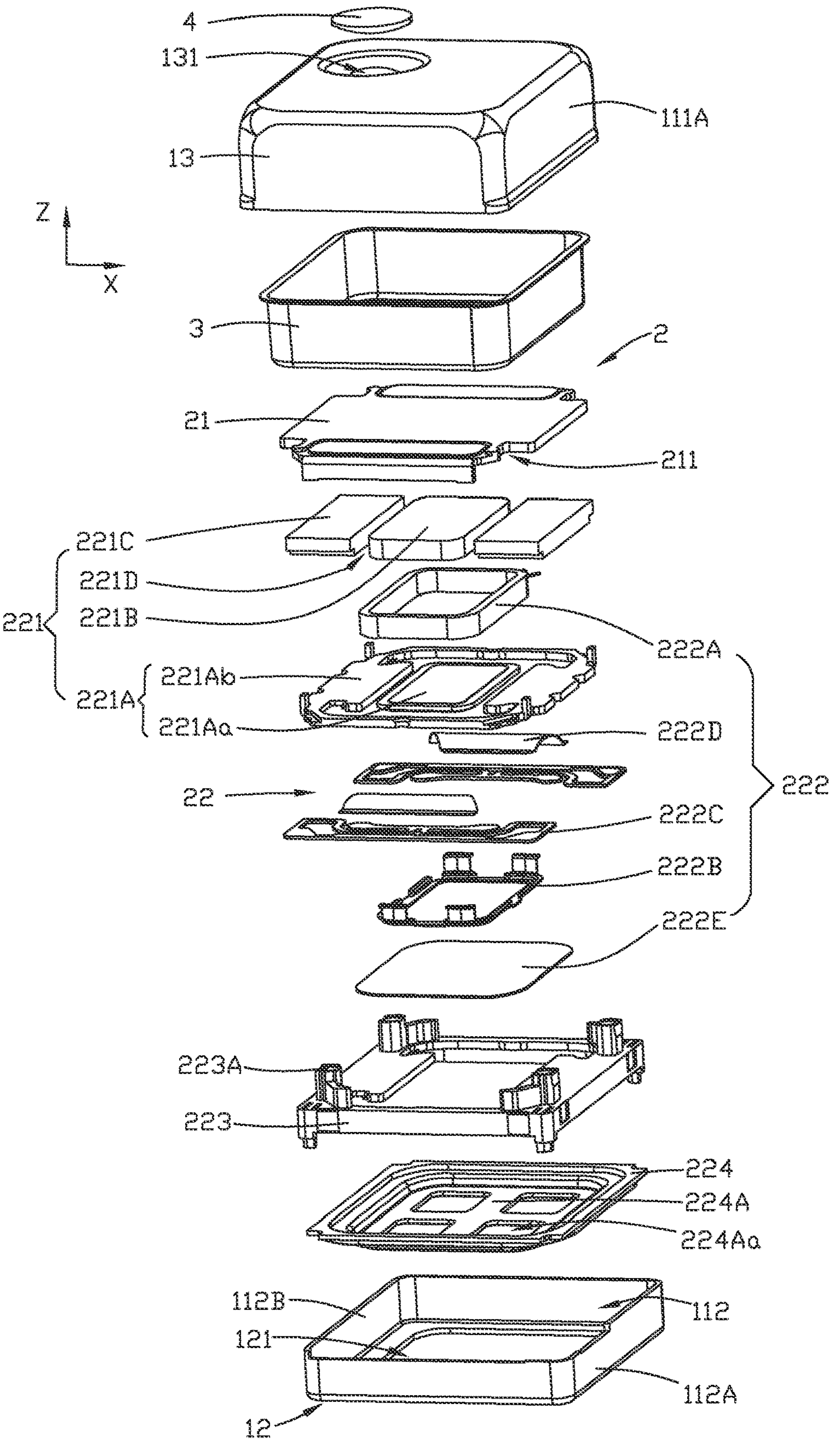
FIG. 4 is an exploded view of the speaker.
Figure 5:
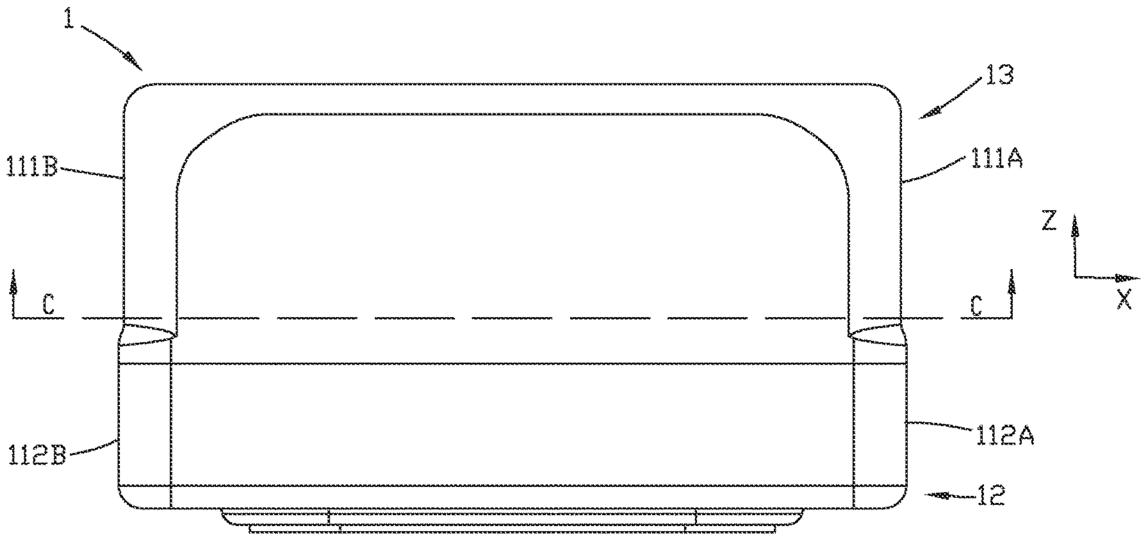
FIG. 5 is a front view of the speaker.

Specifically, as shown in FIGS. 2-4, the sounding component 22 includes a magnetic circuit system 221, a vibration system 222, a basin frame 223 and a cover 224. The basin frame 223 is connected to the front housing 12. Along the height direction Z of the accommodation cavity 11, the connection part 21 and the cover 224 are arranged opposite to each other. The connection part 21 and the cover 224 are respectively covered on both sides of the basin frame 223, and are enclosed with the basin frame 223 to form a containment space. Both the magnetic circuit system 221 and the vibration system 222 are located in the containment space.

In this embodiment, along the height direction Z of the accommodation cavity 11, the connection part 21 is located above the basin frame 223, and the cover 224 is located below the basin frame 223. The basin frame 223 provides support for the magnetic circuit system 221 and the vibration system 222, and facilitates the installation of the magnetic circuit system 221 and the vibration system 222. When the sounding component 22 emits sound, under the action of the magnetic field of the magnetic circuit system 221, the internal components of the vibration system 222 are driven to move, and then the sound is generated.

Wherein, the magnetic circuit system 221 includes a magnetic conductive plate 221A, a first magnet 221B and at least two second magnets 221C. Both first magnet 221B and second magnet 221C are connected to connection part 21. Along the height direction Z of the accommodation cavity 11, the magnetic conductive plate 221A is located below the first magnet 221B and the second magnet 221C. Along the height direction Z perpendicular to the accommodation cavity 11, two second magnets 221C are disposed on opposite sides of the first magnet 221B, respectively. A magnetic gap 221D is formed between the first magnet 221B and the second magnet 221C. The vibration system 222 includes a voice coil 222A, a bracket 222B, at least two electric conductive plates 222C, and at least two vibration diaphragms 222D. The voice coil 222A is located in the magnetic gap 221D, and the two electric conductive plates 222C are located on opposite sides of the voice coil 222A. One end of the electric conductive plate 222C is connected to the basin frame 223, and the other end is connected to the bracket 222B. The diaphragm 222D is connected to the electric conductive plate 222C, and the voice coil 222A is connected to the bracket 222B. The voice coil 222A is electrically connected to the electric conductive plate 222C.

In this embodiment, the voice coil 222A is electrically connected to the electric conductive plate 222C, and the electric conductive plate 222C is electrically connected to an external power source. The electrical connection here refers to welding, riveting, screwing, etc. between two or more electric conductive components, so as to allow current to pass between the two or more electric conductive components. When an alternating current is passed through the voice coil 222A, the voice coil 222A in the magnetic gap 221D will move due to the action of the magnetic field. As the current changes, this movement also changes, and the voice coil 222A is connected to the electric conductive plate 222C through the bracket 222B, and the electric conductive plate 222C is connected to the vibration diaphragm 222D. When the voice coil 222A moves in the magnetic gap 221D, it can drive the vibration diaphragm 222D to move, resulting in the generation of sound.

In this embodiment, there are at least two second magnet 221Cs, two second magnet 221Cs can be set, or four, six or more second magnet 221Cs can be set. A plurality of second magnets 221C are arranged along the circumference of the first magnet 221B. At least two electric conductive plates 222C may be provided, two electric conductive plates 222C may be provided, or four, six or more electric conductive plates 222C may be provided. At least two vibration diaphragms 222D, two vibration diaphragms 222D may be provided, and four, six or more vibration diaphragms 222D may be provided.

The electric conductive plate 222C can be a flexible circuit board or a rigid-flex board or the like.

Further, as shown in FIGS. 2-4, the vibration system 222 also includes a dome 222E, along the height direction Z of the accommodation cavity 11, the dome 222E is arranged opposite to the voice coil 222A. The dome 222E is located below the voice coil 222A, and the dome 222E is connected to the bracket 222B.

In a specific embodiment, as shown in FIG. 4, the front housing 12 is provided with a first through hole 121, and the second chamber 112 is connected with the outside world through the first through hole 121. The cover 224 is provided with a panel 224A. The panel 224A is provided with a sound exit hole 224Aa, and the panel 224A extends out of the first through hole 121.

In this embodiment, the cover 224 is provided with a frame and a panel 224A connected to each other, and the frame is connected to the bottom wall of the front housing 12. The first through hole 121 is provided on the bottom wall of the front housing 12. The panel 224A is provided with a sound exit hole 224Aa, and the panel 224A extends out of the first through hole 121, that is, the sound exit hole 224Aa is located outside the front housing 12 and along the height direction Z of the accommodation cavity 11. Panel 224A is located below voice coil 222A and vibration diaphragm 222D. When an alternating current is passed into the voice coil 222A, under the action of the magnetic field of the magnetic circuit system 221, the voice coil 222A is driven to move, and the voice coil 222A drives the vibration diaphragm 222D to move to generate sound waves, which pass through the sound exit hole 224Aa to the outside world. Since the sound exit hole 224Aa is directly arranged outside the front housing 12, it is convenient for the transmission of sound waves, thereby helping to improve the sound effect of the speaker.

In a specific embodiment, as shown in FIGS. 2-4, the magnetic conductive plate 221A includes a first magnetic conduction plate 221Aa and a second magnetic conduction plate 221Ab. The first magnetic conduction plate 221Aa is connected to the first magnet 221B. The first magnetic conduction plate 221Aa is sheathed in the voice coil 222A. The second magnetic conduction plate 221Ab is connected to the second magnet 221C. The second magnetic conduction plate 221Ab surrounds the voice coil 222A.

In this embodiment, along the height direction Z of the accommodation cavity 11, the first magnetic conduction plate 221Aa is located below the first magnet 221B, and is sleeved inside the voice coil 222A. The second magnetic conduction plate 221Ab is located below the second magnet 221C, and surrounds the voice coil 222A. It helps to improve the magnetic conductivity and reduce the magnetic leakage phenomenon.

Figure 6:
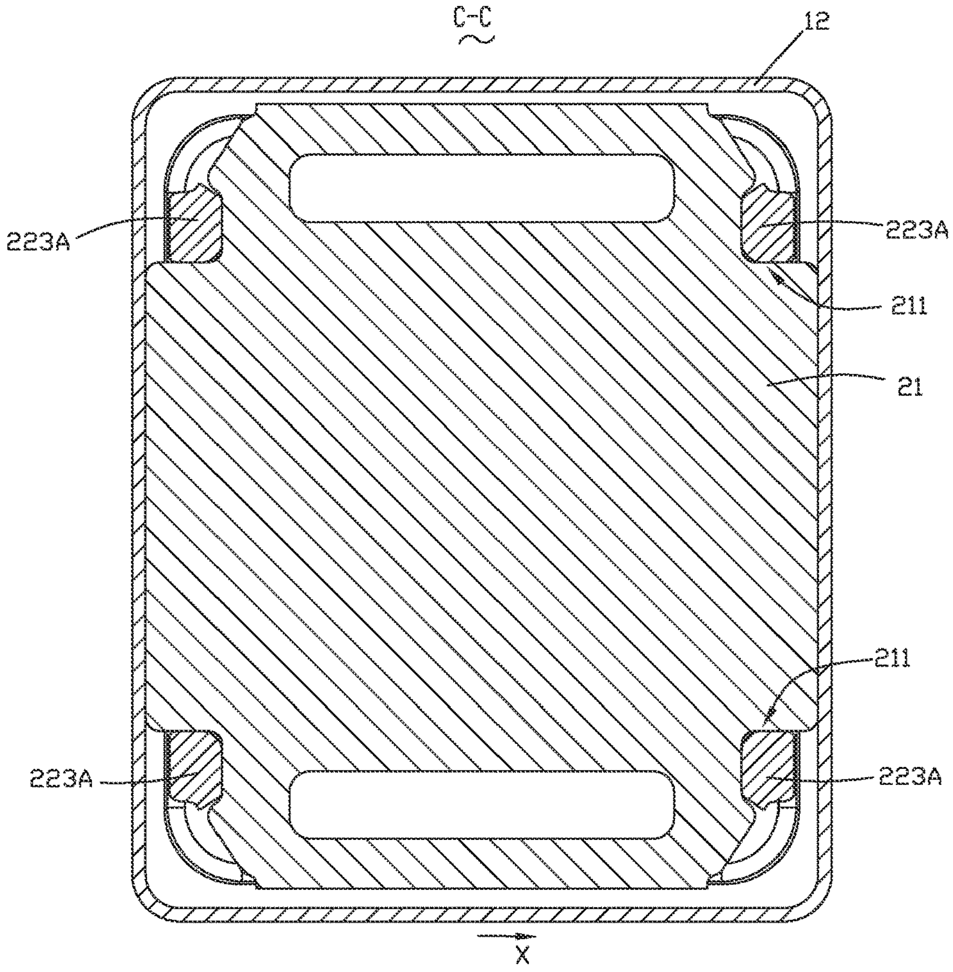
FIG. 6 is a cross-sectional view of the speaker taken along line CC in FIG. 5.

In a specific embodiment, as shown in FIG. 4 and FIG. 6, the connection part 21 includes a plurality of positioning gaps 211 arranged at intervals. The basin frame 223 is provided with a plurality of positioning blocks 223A arranged at intervals. The positioning block 223A is set corresponding to the positioning gap 211. The positioning block 223A can abut against two adjacent side surfaces of the positioning gap 211.

In this embodiment, the connection part 21 is provided with four positioning gaps 211 along its circumferential direction. The positioning gaps 211 are opposite to each other, and the basic frame 223 is correspondingly provided with four positioning blocks 223A. When the connection part 21 is installed on the basic frame 223, each positioning block 223A abuts against two adjacent side surfaces of the corresponding positioning gap 211, so that the positioning block 223A and the positioning gap 211 are positioned and matched, so as to improve the installation accuracy of the connection part 21.

In a specific embodiment, as shown in FIGS. 2-4, the speaker further includes a box 3, which is located in the first chamber 111 and connected to the rear housing 13, and the box 3 is used for placing sound-absorbing particles.

In this embodiment, box 3 is located in first chamber 111 and connected to the top wall of rear housing 13. The box 3 is used to place the sound-absorbing particles, that is, the top wall of the box 3 and the rear housing 13 forms a sound absorbing cavity, which is used to improve the pressure difference between the inside and the outside of the housing body 1 when the speaker unit 2 moves.

Specifically, as shown in FIG. 4, one side of the box 3 is arranged with an opening, and the rear housing 13 is provided with a second through hole 131. The box 3 is connected with the outside through the second through hole 131. The speaker also includes a sealing plug 4, which is used to block the second through hole 131.

In this embodiment, the opening of box 3 is toward the top wall of rear housing 13. The top wall of the rear housing 13 is provided with a second through hole 131, and sound-absorbing particles can be injected into the box 3 through the second through hole 131, so that the amount of the sound-absorbing particles in the box 3 can be easily adjusted. After the sound-absorbing particles are injected, the sealing plug 4 is inserted into the second through hole 131 to block the second through hole 131.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, including:

a housing body having an accommodation cavity with a first chamber and a second chamber oppositely arranged along a height direction;

a first side wall and a second side wall enclosing the first chamber along a width direction of the accommodation cavity;

a third side wall and a fourth side wall enclosing the second chamber;

a speaker unit including a connection part located in the first chamber and a sounding component connecting to the connection part; wherein two ends of the connection part are respectively connected with the first side wall and the second side wall, and at least part of the sounding component is located in the second chamber;

the first side wall and the third side wall are connected; the second side wall and the fourth side wall are connected; a distance between the first side wall and the second side wall is smaller than a distance between the third side wall and the fourth side wall, the housing body includes a front housing and a rear housing oppositely arranged along the height direction of the accommodation cavity; the front housing and the rear housing are connected for enclosing the accommodation cavity; the first chamber is arranged in the rear housing, and the second chamber is arranged in the front housing, the sounding component includes a magnetic circuit system, a vibration system, a basin frame and a cover, the basin frame is connected with the front housing, along the height direction of the accommodation cavity, the connection part is set opposite to the cover; the connection part and the cover are respectively covered on both sides of the basin frame, and are enclosed with the basin frame to form a containment space; both the magnetic circuit system and the vibration system are located in the containment space.

2. The speaker as described in claim 1, wherein the front housing includes a first through hole; the second chamber is connected with the outside through the first through hole; the cover is provided with a panel; the panel is provided with a sound exit hole; the panel protrudes from the first through hole.

3. The speaker as described in claim 1, wherein the connection part includes a plurality of spaced positioning gaps; the basin frame is provided with a plurality of spaced positioning blocks; the positioning block is set corresponding to the positioning gap; the positioning block can abut against two adjacent side surfaces of the positioning gap.

4. The speaker as described in claim 1, wherein the magnetic circuit system includes a magnetic conductive plate, a first magnet and at least two second magnets; both the first magnet and the second magnet are connected to the connection part; along the height direction of the accommodation cavity, the magnetic conductive plate is located below the first magnet and the second magnet; along the height direction perpendicular to the accommodation cavity, the two second magnets are disposed on opposite sides of the first magnet, respectively; a magnetic gap is formed between the first magnet and the second magnet; and wherein the vibration system includes a voice coil, a bracket, at least two electric conductive plates and at least two vibration diaphragms; the voice coil is located within the magnetic gap; the two electric conductive plates are located on opposite sides of the voice coil; one end of the electric conductive plate is connected to the basin frame, and the other end is connected to the bracket; the vibration diaphragm is connected to the electric conductive plate; the voice coil is connected to the bracket and electrically connected to the electric conductive plate.

5. The speaker as described in claim 4, wherein the vibration system also includes a dome, along the height direction of the accommodation cavity, the dome is disposed opposite to the voice coil, the dome is connected to the bracket.

6. The speaker as described in claim 4, wherein the magnetic conductive plate includes a first magnetic conduction plate and a second magnetic conduction plate, and the first magnetic conduction plate is connected to the first magnet; the first magnetic conduction plate is sheathed in the voice coil; the second magnetic conduction plate is connected to the second magnet; the second magnetic conduction plate surrounds the voice coil.

7. The speaker as described in claim 1, further including a box located in the first chamber and connected with the rear housing; wherein the box is used for placing sound-absorbing particles.

8. The speaker as described in claim 7, wherein one side of the box includes an opening, and the rear housing includes a second through hole; the box is connected with the outside world through the second through hole.

9. The speaker as described in claim 7 further including a sealing plug for blocking the second through hole.

* * * * *